(12) United States Patent
Lu et al.

(10) Patent No.: US 10,895,924 B2
(45) Date of Patent: Jan. 19, 2021

(54) DISPLAY SUBSTRATE, DISPLAY PANEL AND DISPLAY DEVICE

(71) Applicant: SHANGHAI TIANMA MICRO-ELECTRONICS CO., LTD., Shanghai (CN)

(72) Inventors: Feng Lu, Shanghai (CN); Takatori Kenichi, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 135 days.

(21) Appl. No.: 15/912,567

(22) Filed: Mar. 6, 2018

(65) Prior Publication Data

US 2018/0196566 A1 Jul. 12, 2018

(30) Foreign Application Priority Data

Jul. 28, 2017 (CN) .......................... 2017 1 0630455

(51) Int. Cl.
*G06F 3/041* (2006.01)
*G02F 1/1333* (2006.01)

(52) U.S. Cl.
CPC ...... *G06F 3/0412* (2013.01); *G02F 1/133308* (2013.01); *G06F 3/04142* (2019.05);
(Continued)

(58) Field of Classification Search
CPC ...... G06F 3/0412; G06F 3/044; G06F 3/0414; G06F 2203/04105; G06F 3/04142;
(Continued)

(56) References Cited

U.S. PATENT DOCUMENTS 5,170,237 A * 12/1992 Tsuda .................... G01L 9/0042
                                                                                                       257/419
6,838,303 B2 * 1/2005 Wang .................... G01L 9/0054
                                                                                                       438/50

(Continued)

FOREIGN PATENT DOCUMENTS

CN        102472678 A     5/2012
CN        105511679 A     4/2016

(Continued)

OTHER PUBLICATIONS

Office Action of Chinese Patent Application No. 201710630455.5 dated Nov. 27, 2019.

*Primary Examiner* — Jason M Mandeville
(74) *Attorney, Agent, or Firm* — Kilpatrick Townsend & Stockton, LLP

(57) ABSTRACT

The present disclosure provides a display substrate, a display panel and a display device. The display substrate includes a display region and a peripheral region surrounding the display region. Silicon-based force sensors are provided in the peripheral region. Each of the force sensors is rectangle-shaped and has a first side, a second side, a third side and a fourth side interconnected end-to-end. A first signal input part is electrically connected at a first corner formed between the first side and the second side, a first signal output part is electrically connected at a second corner formed between the second side and the third side, a second signal input part is electrically connected at a third corner formed between the third side and the fourth side, and a second signal output part is electrically connected at a fourth corner formed between the fourth side and the first side.

15 Claims, 9 Drawing Sheets

(52) U.S. Cl.
CPC .... *G02F 1/13338* (2013.01); *G02F 2201/121* (2013.01); *G02F 2201/123* (2013.01); *G06F 2203/04105* (2013.01)

(58) Field of Classification Search
CPC ........... G02F 1/133308; G02F 1/13338; G02F 2201/123; G02F 2201/121; G09F 9/00
USPC .................................................. 345/173–174
See application file for complete search history.

(56) References Cited

U.S. PATENT DOCUMENTS

| | | | |
|---|---|---|---|
| 10,222,281 B2* | 3/2019 | Mizuno | G01L 1/18 |
| 2004/0223884 A1* | 11/2004 | Chen | G01N 29/036 |
| | | | 422/88 |
| 2010/0123686 A1* | 5/2010 | Klinghult | G06F 3/0412 |
| | | | 345/178 |
| 2012/0118068 A1* | 5/2012 | Yamada | G01L 9/0051 |
| | | | 73/754 |
| 2016/0299025 A1* | 10/2016 | Chen | G01L 9/0042 |

FOREIGN PATENT DOCUMENTS

| | | |
|---|---|---|
| CN | 206133514 U | 4/2017 |
| JP | H03112169 A | 5/1991 |
| JP | H058683 A | 1/1993 |
| JP | H05164635 A | 6/1993 |
| JP | H08316495 A | 11/1996 |
| JP | 2008261855 A | 10/2008 |
| JP | 5637681 B2 | 12/2014 |

* cited by examiner

DISPLAY SUBSTRATE, DISPLAY PANEL AND DISPLAY DEVICE

CROSS-REFERENCE TO RELATED APPLICATIONS

The present application claims priority to Chinese Patent Application No. 201710630455.5, filed on Jul. 28, 2017, the content of which is incorporated herein by reference in its entirety.

TECHNICAL FIELD

The present disclosure is related to the field of display technology, and in particular to a display substrate, a display panel and a display device.

BACKGROUND

A display panel with a touch-controlled function is widely applied to various display devices, such as a mobile phone, a tablet computer, an information querying machine in a public place, etc. In order to achieve an operation for the display device, a user only needs to press an identifier on a display panel, which eliminates an reliance with respect to additional input devices (e.g. keyboard, mouse, etc.), and thus simplifies human-computer interaction.

In one embodiment, a force sensor, which is used to detect a force of the user pressing the display panel, is provided at a circumference of the display panel. In this case, the display panel can not only collect location information, but also collect a magnitude of the force, so as to broaden an application range of the touch-controlled technology. A common force sensor is a silicon-based force sensor. In the related art, a silicon-based force sensor is rectangle shaped and has a larger size, so that a frame of the display panel becomes wider, which is to the disadvantage for narrowing the display panel.

SUMMARY

Embodiments of the present disclosure provide a display substrate, a display panel and a display device, for reducing a frame width of the display panel, which may provide a narrow frame of the display panel.

One embodiment provides a display substrate, the display substrate includes a display region and a peripheral region surrounding the display region. A plurality of force sensors, which are silicon-based force sensors, is provided in the peripheral region. Each of the force sensors is rectangle-shaped and has a first side, a second side, a third side and a fourth side interconnected end-to-end. A first signal input part is electrically connected at a first corner formed between the first side and the second side, a first signal output part is electrically connected at a second corner formed between the second side and the third side, a second signal input part is electrically connected at a third corner formed between the third side and the fourth side, and a second signal output part is electrically connected at a fourth corner formed between the fourth side and the first side.

One embodiment provides a display panel including a display substrate, and the display substrate includes a display region and a peripheral region surrounding the display region. A plurality of force sensors, which are silicon-based force sensors, is provided in the peripheral region. Each of the force sensors is rectangle-shaped and has a first side, a second side, a third side and a fourth side interconnected end-to-end. A first signal input part is electrically connected at a first corner formed between the first side and the second side, a first signal output part is electrically connected at a second corner formed between the second side and the third side, a second signal input part is electrically connected at a third corner formed between the third side and the fourth side, and a second signal output part is electrically connected at a fourth corner formed between the fourth side and the first side.

One embodiment provides a display device including a display panel. The display panel includes a display substrate, and the display substrate includes a display region and a peripheral region surrounding the display region. A plurality of force sensors, which are silicon-based force sensors, is provided in the peripheral region. Each of the force sensors is rectangle-shaped and has a first side, a second side, a third side and a fourth side interconnected end-to-end. A first signal input part is electrically connected at a first corner formed between the first side and the second side, a first signal output part is electrically connected at a second corner formed between the second side and the third side, a second signal input part is electrically connected at a third corner formed between the third side and the fourth side, and a second signal output part is electrically connected at a fourth corner formed between the fourth side and the first side.

Embodiments of the present disclosure provide a display substrate, a display panel and a display device. The display substrate includes a display region and a peripheral region surrounding the display region. A plurality of force sensors, i.e. silicon-based force sensors, is provided in the peripheral region. The force sensor is rectangle shaped, and has a first side, a second side, a third side and a fourth side interconnected end-to-end. The inventor of the present disclosure found that, because two signal input parts of the force sensor in the related art are provided on two sides opposite to each other of the force sensor respectively, and two signal output parts are provided on the other two sides of the force sensor, the portion of the force sensor making the most contribution to the output signal is a portion located between adjacent signal input ends and signal output ends, i.e. regions corresponding to four corners, so that most regions in the force sensor make less contribution to the output signal. In comparison, in the force sensor according to the embodiments of the present disclosure, a first signal input part is connected at the corner between the first side and the second side, a first signal output part is connected at the corner between the second side and the third side, a second signal input part is connected at the corner between the third side and the fourth side, and a second signal output part is connected at the corner between the fourth side and the first side, so that the portion of the force sensor according to the embodiments of the present disclosure making the most contribution to the output signal is the regions corresponding to the four sides. As for the same force sensor, the area of the regions corresponding to the four sides may be larger than the area of the regions corresponding to the four corners. Therefore, when the force sensor according to the embodiments of the present disclosure has a performance similar to that of the force sensor in the related art (i.e. the area of the region corresponding to the four sides in the embodiments of the present disclosure is close to the area of the region corresponding to the four corners in the related art), the size of the force sensor according to the embodiments of the present disclosure is less than the size of the force sensor in the related art, so as to reduce the frame width of the display panel, which may provide narrowing the frame of the display panel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It is appreciated that, the drawings described as follows are merely part of the embodiments of the present disclosure.

DESCRIPTION OF EMBODIMENTS

Embodiments of the present disclosure may be combined with each other. Hereinafter, the present disclosure would be described in detail by referring to accompanying drawings and in combination with the embodiments.

Figure 1:
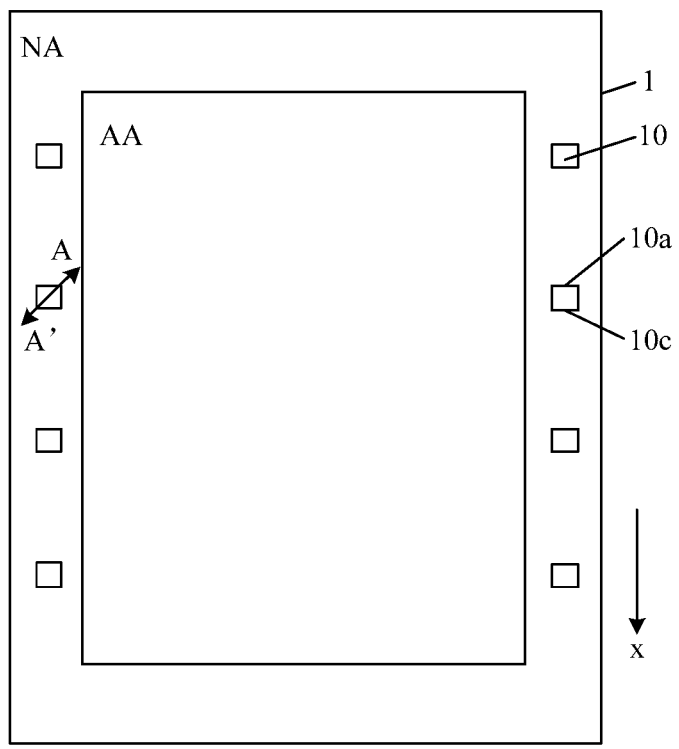
FIG. 1 is a top view of a display substrate according to an embodiment of the present disclosure.

An embodiment of the present disclosure provides a display substrate, as shown in FIG. 1. FIG. 1 is a top view of a display substrate according to an embodiment of the present disclosure. The display substrate 1 includes a display region AA and a peripheral region NA surrounding the display region AA. A plurality of force sensors 10, which are silicon-based force sensors, is provided in the peripheral region NA.

Figure 2:
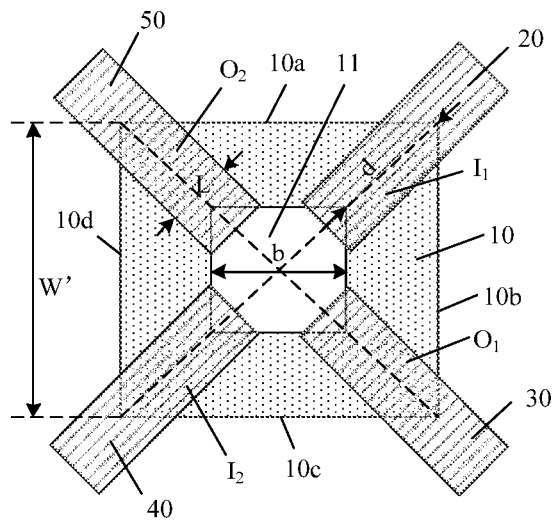
FIG. 2 is a first top view of a force sensor according to an embodiment of the present disclosure.
Figure 3:
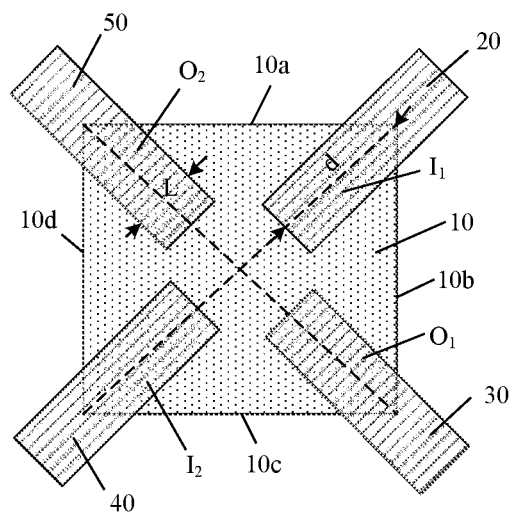
FIG. 3 is a second top view of a force sensor according to an embodiment of the present disclosure.

As shown in FIG. 2 and FIG. 3, FIG. 2 is a first top view of a force sensor according to an embodiment of the present disclosure, and FIG. 3 is a second top view of a force sensor according to an embodiment of the present disclosure. The sensors 10 are rectangle-shaped (in FIG. 2 and FIG. 3, for example, the force sensors 10 are square-shaped), and a first side 10a, a second side 10b, a third side 10c and a fourth side 10d are interconnected end-to-end sequentially. A first signal input part 20 is electrically connected at a corner formed between the first side 10a and the second side 10b, a first signal output part 30 is electrically connected at a corner formed between the second side 10b and the third side 10c, a second signal input part 40 is electrically connected at a corner formed between the third side 10c and the fourth side 10d, and a second signal output part 50 is electrically connected at a corner formed between the fourth side 10d and the first side 10a.

The force sensor 10 with the above-mentioned structure includes a first signal input end $I_1$ (i.e. a location at which the force sensor 10 is electrically connected with the first signal input part 20), a second signal input end $I_2$ (i.e. a location at which the force sensor 10 is electrically connected with the second signal input part 40), a first signal output end $O_1$ (i.e. a location at which the force sensor 10 is electrically connected with the first signal output part 30), and a second signal output end $O_2$ (i.e. a location at which the force sensor 10 is electrically connected with the second signal output part 50). The first signal input end $I_1$ and the second signal input end $I_2$ are used to input a bias voltage signal into the force sensor 10, and the first signal output end $O_1$ and the second signal output end $O_2$ are used to output a force-sensing detection signal from the force sensor 10.

Figure 4:
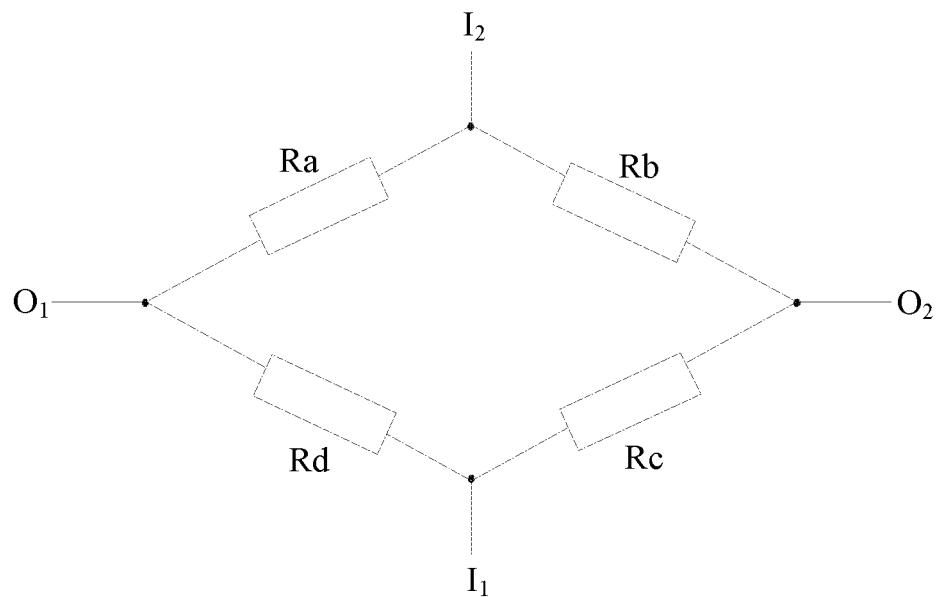
FIG. 4 is an equivalent circuit diagram of a force sensor according to an embodiment of the present disclosure.

The force sensor 10 may be equivalent to a Wheatstone bridge. As shown in FIG. 4 which is an equivalent circuit diagram of the force sensor 10 according to an embodiment of the present disclosure. The Wheatstone bridge includes four equivalent resistances, which are: an equivalent resistance Ra, an equivalent resistance Rb, an equivalent resistance Rc and an equivalent resistance Rd. The equivalent resistance Ra is a region between the second signal input end $I_2$ and the first signal output end $O_1$, the equivalent resistance Rb is a region between the second signal input end $I_2$ and the second signal output end $O_2$, the equivalent resistance Rd is a region between the first signal input end $I_1$ and the first signal output end $O_1$, and the equivalent resistance Rc is a region between the first signal input end $I_1$ and the second signal output end $O_2$. When the bias voltage signal is input to the first signal input end $I_1$ and the second signal output end $I_2$, current flows through all of branches of the Wheatstone bridge. In this case, when the display substrate 1 is pressed, the entire display substrate 1 may be deformed. Because the force sensor 10 is subject to an effect of a shearing force from a location corresponding to the force sensor 10 on the display substrate 1, at least one of the equivalent resistance Ra, the equivalent resistance Rb, the equivalent resistance Rc and the equivalent resistance Rd changes, so that the force-sensing detection signal output from the first signal output end $O_1$ and the second signal output end $O_2$ of the force sensor 10 is different from the force-sensing detection signal output from the first signal output end $O_1$ and the second signal output end $O_2$ of the force sensor 10 when no pressing is applied, and on this basis a magnitude of a touch-controlled force can be determined.

Figure 5:
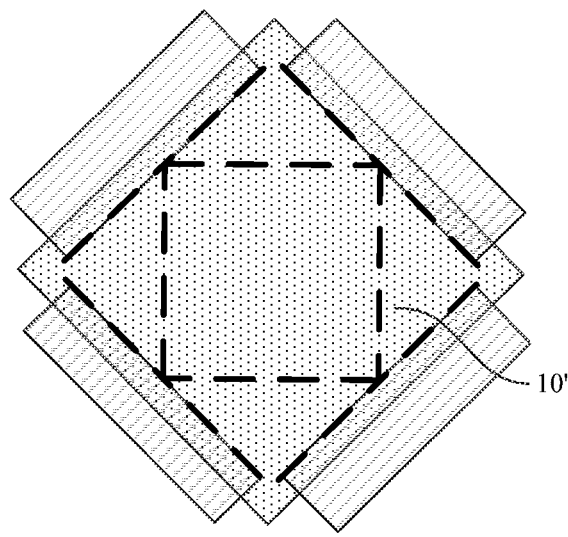
FIG. 5 is a top view of a force sensor in the related art.

As shown in FIG. 5, FIG. 5 is a top view of a force sensor in the related art. In related art, two signal input parts of the force sensor 10' are electrically connected with two sides opposite to each other of the force sensor 10' respectively, and two signal output parts are electrically connected with the other two sides opposite to each other of the force sensor 10'. A part of the force sensor 10' which makes the most contribution to an output signal is a part located between a signal input end and a signal output part adjacent to each other, i.e. each of regions corresponding to four corners (as shown in the triangle dashed frame in FIG. 5). That is, most of the region in the force sensor 10' makes less contribution to the output signal.

As shown in FIG. 2 and FIG. 3, a first signal input part 20 is electrically connected at a corner formed between a first side 10a and a second side 10b, a first signal output part 30 is electrically connected at a corner formed between the second side 10b and a third side 10c, a second signal input part 40 is electrically connected at a corner formed between the third side 10c and a fourth side 10d, and a second signal output part 50 is electrically connected at a corner formed between the fourth side 10d and the first side 10a, so that the part in the force sensor 10 according to the present disclosure which makes most contribution to the output signal is each of regions corresponding to four sides. As for the same force sensor, an area of a region corresponding to the four sides may be larger than an area of a region corresponding to four corners. Therefore, under the circumstance that the force sensor of the present disclosure has a performance similar to that of the force sensor in the related art (i.e. the area of the region corresponding to four sides according to the present disclosure is close to the area of the region corresponding to the four corners in the related art), a size of the force sensor 10 according to the present disclosure is less than a size of the force sensor in the related art, so as to decrease a width of a frame of the display panel and be beneficial to a narrow frame of the display panel. The reason lie in that, when the size of the force sensor 10 is relatively large, a lot more heat will be generated during its operation procedure, thus the temperature of the force sensor 10 will be increased, which results in that the resistance of the force sensor 10 is changed, causing the output signal of the output end change accordingly, therefore bringing interference to the force detection. In the present disclosure, the size of the force sensor is decreased, thereby alleviating the adverse influence of temperature on the force sensor, and thus improving the detection accuracy.

Moreover, the force sensor 10 according to the present disclosure has a smaller size, so a temperature has less influence on the force sensor 10, which is beneficial to the improvement for the performance of the force sensor 10.

Figure 6:
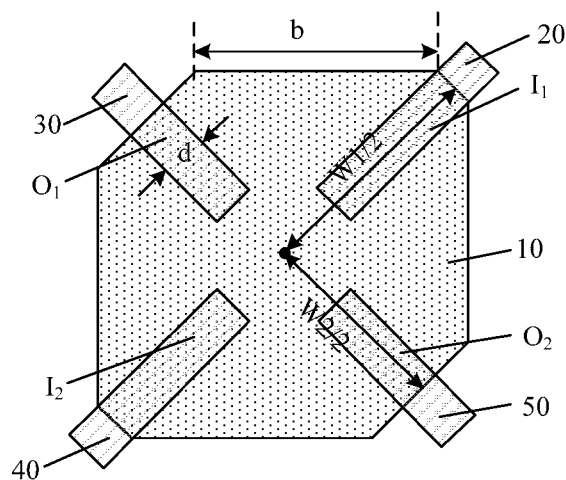
FIG. 6 is a third top view of a force sensor according to an embodiment of the present disclosure.

As an example, the force sensor 10 according to an embodiment of the present disclosure is square shaped or approximately square shaped. As shown in FIG. 2 and FIG. 3, the force sensor 10 is square shaped. As shown in FIG. 6, which is a third top view of a force sensor according to an embodiment of the present disclosure, the force sensor 10 is approximately square-shaped. For example, the shape of the force sensor 10 is a corner-missing square in which corners at each of locations corresponding to the first signal input end 20, the second signal input end 40, the first signal output end 30 and the second signal output end 50 are not presented.

As above described, a magnitude of a force can be deduced from the amplitude of the first signal output end $O_1$ and the second signal output end $O_2$ of the force sensor 10. A galvanometer may be connected between the first signal output end $O_1$ and the second signal output end $O_2$. The magnitude can be determined based on the difference between a scale of the galvanometer without any deformation of the force sensor and a scale of the galvanometer with deformation of the force sensor.

When the force sensor 10 as shown in FIG. 2 and FIG. 3 is square shaped, a resistance between the first signal input end $I_1$ and the first signal output end $O_1$ of the force sensor 10 is numerically equal to a resistance between the first signal input end $I_1$ and the second signal output end $O_2$, and a resistance between the second signal input end $I_2$ and the first signal output end $O_1$ of the force sensor 10 is numerically equal to a resistance between the second signal input end $I_2$ and the second signal output end $O_2$. Both an overlapping area and a contact resistance between all signal input and output parts and the force sensor 10 are numerically equal, so that when the force sensor 10 does not subject to any deformation, the first signal output end $O_1$ and the second signal output end $O_2$ of the force sensor 10 have the same output value, and a galvanometer there between indicates 0-scale. Further, when the force sensor 10 subjects to deformation, a galvanometer with a smaller range is used to detect a current flowing between the first signal output end $O_1$ and the second signal output end $O_2$. In this case, a more precise value can be read by the galvanometer, so that the force can be obtained more precisely according to the calculation of the current, and a detection precision of the force sensor 10 is improved.

The same overlapping areas between all the signal input and output parts and the force sensor 10 leads to the same contact resistances, this is because: if each signal input part and each signal output part are directly overlapped over the force sensor 10, the same overlapping areas between all of the signal input and output parts and the force sensor 10 may lead to the same contact areas and the same contact resistances; and if all of the signal input and output parts are electrically connected with the force sensor 10 via a plurality of through-holes, since diameters of all the through-holes and spacing between adjacent through-holes keep constant, when the overlapping areas between all of the signal input and output parts and the force sensor 10, the numbers and the sizes of the through-holes at which all of the signal input and output parts and the force sensor 10 are electrically connected are the same. Therefore, the contact areas and the contact resistances between all of the signal input and output parts and the force sensor are the same. Similarly, the larger the overlapping areas between all of the signal input parts or the signal output parts and the force sensor 10, the smaller the contact resistances; on the other hand, the smaller the overlapping areas, the larger the contact resistances.

When the force sensor 10 is approximately square shaped as shown in FIG. 6, the overlapping areas between the force sensor 10 and all of the signal input parts are numerically different from the overlapping areas between the force sensor 10 and all of the signal output parts, so that the contact resistances between the force sensor 10 and all of the signal input parts are numerically different from the contact resistances between the force sensor 10 and all of the signal output parts, though the resistance between the first signal input end $I_1$ and the first signal output end $O_1$ of the force sensor 10 is numerically equal to the resistance between the first signal input end $I_1$ and the second signal output end $O_2$, and the resistance between the second signal input end $I_2$ and the first signal output end $O_1$ of the force sensor 10 is numerically equal to the resistance between the second signal input end $I_2$ and the second signal output end $O_2$. Thus, the overlapping areas between the force sensor 10 and each of the first signal input part 20 and the second signal input part 40 become larger, the contact resistances are smaller; and the overlapping areas between the force sensor 10 and each of the first signal output part 30 and the second signal output part 50 are smaller, and the contact resistances are larger. In this case, the input signals have a larger loss and a larger noise, so that the output signals from all of the signal output parts have a worse intensity. Under this circumstance, the galvanometer connected there between reads a value which is not precise, so that the force value deduced by the calculation for the current is not precise, and the detection precision of the force sensor is poor.

Figure 7:
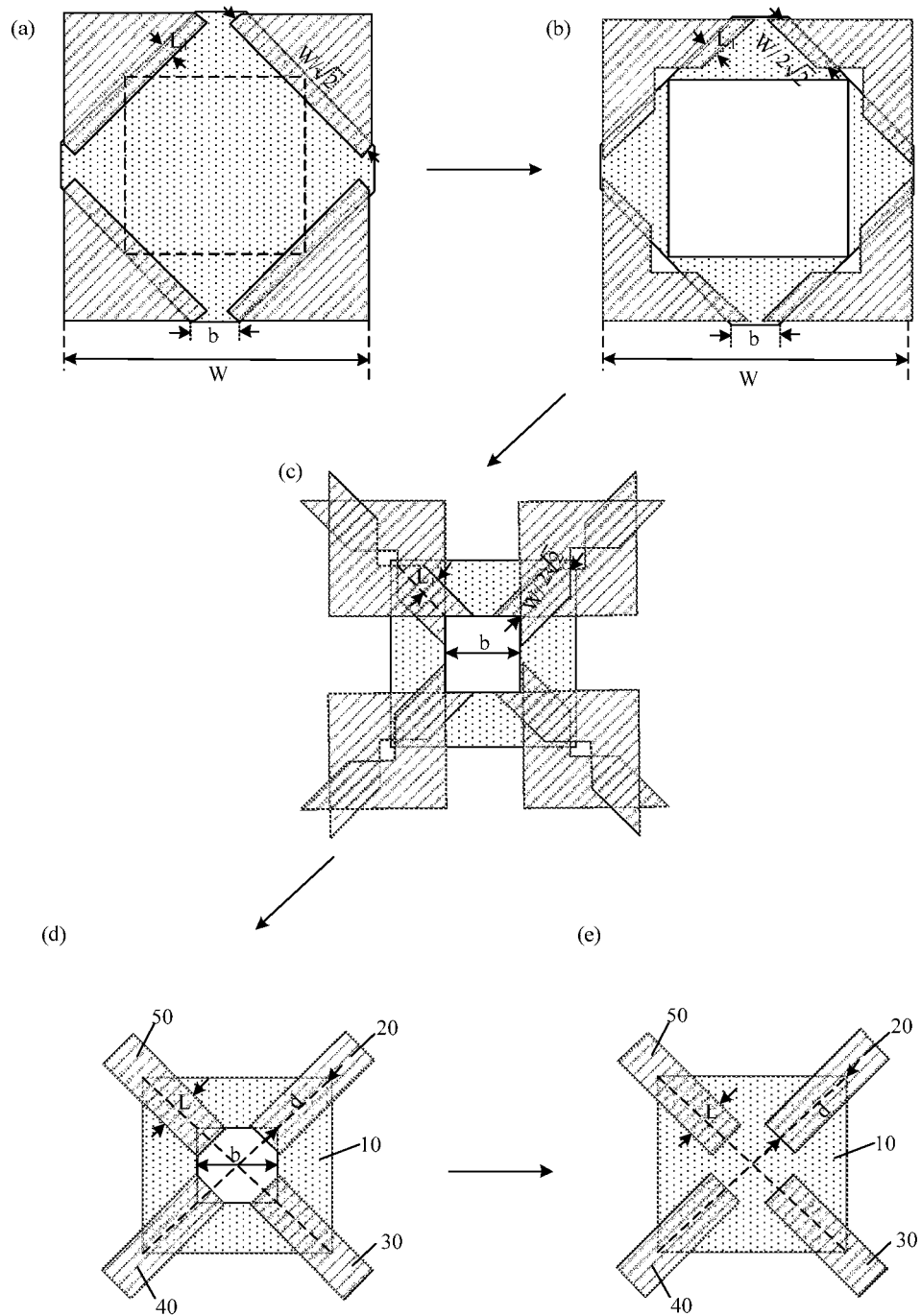
FIG. 7 is a first flow diagram showing a procedure to transfer the force sensor in the related art to the force sensor according to the present disclosure.

In a first example, a square-shaped force sensor is taken for an example. As shown in FIG. 7, FIG. 1 is a first flow diagram according to an embodiment of the present disclosure showing a procedure to transfer a force sensor in the related art to a force sensor of the embodiment of the present disclosure. A force sensor in the related art is shown in FIG. 7(a), and a part of the force sensor making less contribution to the output signal (the part shown in dashed frame of FIG. 7(a)) is eliminated to form a structure shown in FIG. 7(b). Portions in FIG. 7(b) located between adjacent signal input parts and signal output parts are folded inward, and in this duration the overlapping areas between the portions and the corresponding signal input parts and signal output parts keep constant, so as to form a structure shown in FIG. 7(c). Then, useful portions in the signal output parts and signal input parts (i.e. portions contacting with the force sensor) are retained, and useless portions are eliminated, so as to form a structure shown in FIG. 7(d), which is a structure of the force sensor 10 mentioned in the present disclosure. In one embodiment, such a structure may be formed by filling openings of the square shape, so as to form a structure shown in FIG. 7(e), which is another structure of the force sensor 10 mentioned in an embodiment of the present disclosure.

Figure 8:
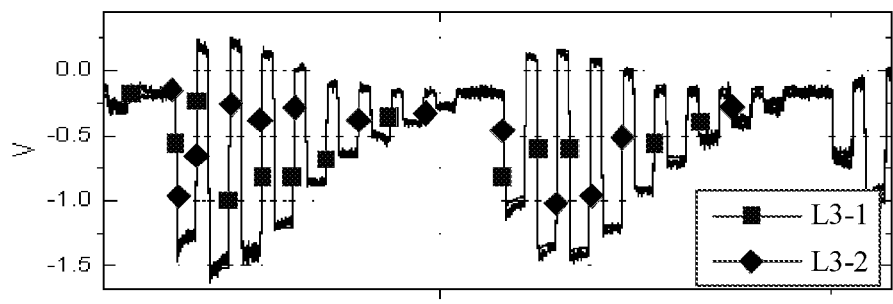
FIG. 8 is a signal simulation diagram of an output signal of the force sensor as shown in FIG. 7(a &b) according to an embodiment of the present disclosure.

FIG. 8 is an output signal simulation diagram of a force sensor shown in FIG. 7(a) and FIG. 7(b) according to an embodiment of the present disclosure. As shown in FIG. 8, a simulation curve containing the output signal of the force sensor with the structure shown in FIG. 7(a) is L3-1, and a simulation curve containing the output signal of the force sensor with the structure shown in FIG. 7(b) is L3-2. In FIG. 8, a horizontal coordinate indicates time, and a longitudinal coordinate indicates output signal. Both the two simulation curves have the same testing details (e.g. force value, force duration, pressing location, etc.). It can be seen from FIG. 8, the curve L3-1 and the curve L3-2 are almost completely overlapped. Therefore, portions in FIG. 7(a) making less contribution to the performance of the output signal (portions shown in the dashed frame in FIG. 7(a)) are eliminated, which does not substantially influence the performance of the force sensor. The subsequent force sensor shown in FIG. 7(d) and force sensor shown in 7(e) are formed after transformation, under the premise that the overlapping areas between the portions and corresponding signal input parts and signal output parts keep unchanged. Therefore, compared to the force sensor shown in FIG. 7(a) in the related art, the force sensor 10 according to the present disclosure, i.e. the force sensor shown in FIG. 7(d) and the force sensor shown in FIG. 7(e), has a performance which would not be substantially influenced, but at the same time the size is reduced.

Figure 9:
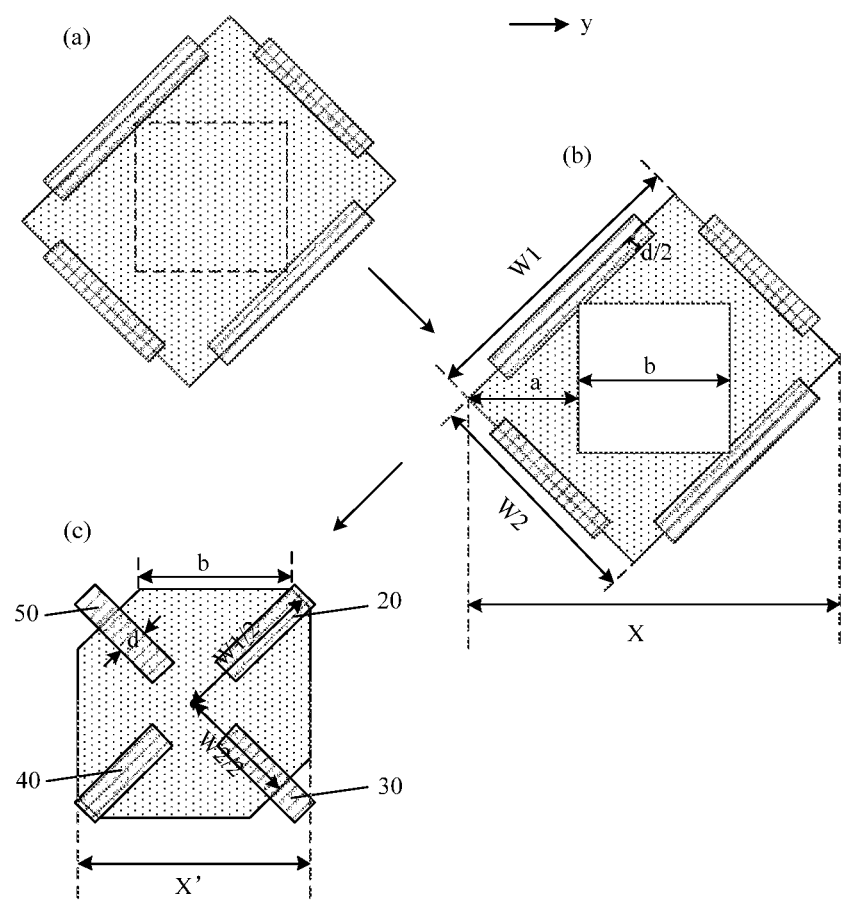
FIG. 9 is a second flow diagram showing a procedure to transfer the force sensor in the related art to the force sensor according to the present disclosure.

Another example takes an approximately square-shaped force sensor as an example, as shown in FIG. 9. FIG. 9 is a second flow diagram showing a procedure to transfer a rectangle-shaped force sensor in the related art to a force sensor according to an embodiment of the present disclosure. A force sensor in the related art is shown in FIG. 9(a), and a portion making less contribution to an output signal (the portion shown in the dashed frame in FIG. 9(a)) is eliminated, so as to form a structure shown in FIG. 9(b). Then, portions in FIG. 9(b) between adjacent signal input parts and signal output parts are folded inward, and in this duration the overlapping areas between the portions and corresponding signal input parts and signal output parts keep unchanged, so as to form a structure shown in FIG. 9(c), which is a structure mentioned in an embodiment of the present disclosure.

Hereinafter, embodiments of the present disclosure describe in detail particular structures of the force sensor 10, respectively regarding a square-shaped force sensor 10 and an approximately square-shaped force sensor 10.

Exemplarily, when the force sensor 10 is square-shaped, the particular structure of the force sensor 10 may include the following two types.

Regarding the first type, as shown in FIG. 2, the force sensor 10 is provided with a square-shaped opening 11, a geometrical center of the square-shaped opening 11 coincides with that of the force sensor 10, so that the force sensor 10 has a larger resistance, which may provide enhancing the intensity of the output signal of the force sensor 10. This is because: on one hand, when the force sensor 10 has a larger resistance, under the same voltage difference, the current between signal input ends and signal output ends is less, and the force sensor 10 has a less heat power dissipation, which may provide enhancing the intensity of the output signal of the force sensor 10; on the other hand, since a plurality of first signal input parts 20 of a plurality of force sensors 10 usually located on one side of peripheral region NA share the same one wiring, which also has a certain resistance. As a result, if the force sensor 10 has a larger resistance, due to a voltage-dividing effect of the wiring, larger voltages would be transferred to the first signal input part 20 and the second signal input part 40 of the force sensor 10. The amplitude of the output signal of the force sensor 10 is proportional to the amplitude of the input signal of the force sensor 10, which is further beneficial for enhancing the intensity of the output signal of the force sensor 10.

On this basis, as shown in FIG. 2, in an embodiment of the present disclosure, the first signal input part 20, the second signal input part 40, the first signal output part 30 and the second signal output part 50 are rectangle-shaped. In such a rectangle shape, long sides extend in a direction which is parallel to a direction of a diagonal line of the force sensor 10 corresponding to a corner formed which it is located, and a midline parallel to a direction of the long side is in line with the diagonal line, so that there is a larger overlapping area between the force sensor 10 and each of the first signal input part 20, the second signal input part 40, the first signal output part 30 and the second signal output part 50, which may provide reducing the contact resistance between the force sensor 10 and each of the first signal input part 20, the second signal input part 40, the first signal output part 30 and the second signal output part 50. The less the contact resistance, the less the loss of each output signal and each input signal during signal transmission, and thus the higher the precision and sensitivity of the force detected by the force sensor 10.

Furthermore, as shown in FIG. 2, the first signal input part 20, the second signal input part 40, the first signal output part 30 and the second signal output part 50 have short sides with the same length L. There are overlapping portions with same length d between the diagonal lines of the force sensor and all of the first signal input part 20, the second signal input part 40, the first signal output part 30 and the second signal output part 50, so that there are the same contact resistances between the force sensor 10 and all of the first signal input part 20, the second signal input part 40, the first signal output part 30 and the second signal output part 50, and thus all the input signals have the same or similar loss during signal transmission, resulting in that the difference between the output signal of the first signal output part 30 and the output signal of the second signal output part 50 can accurately indicate the change of the resistance of the force sensor 10, which may provide improving the precision of the force detected by the force sensor 10.

In one embodiment, the first signal input part 20, the second signal input part 40, the first signal output part 30 and the second signal output part 50 have short sides all of which have lengths of 14-20 µm. It should be noted that, the value of the above length L of the short sides may be deduced based on the size of the force sensor in the related art. For example, as shown in FIG. 7, when a diagonal line of the force sensor in the related art has a length W, as shown in FIG. 7(a), the overlapping portions between the force sensor and all of the signal input parts and signal output parts have widths of $L_1$. As known in FIGS. 7(b)-7(d), in an embodiment of the present disclosure, the length L of the short sides of the first signal input part 20, the second signal input part 40, the first signal output part 30 and the second signal output part 50 may be equal to $2L_1$. Because usually all of the signal input parts and the signal output parts are connected with the force sensor via through-holes, the width $L_1$ of the overlapping portions between the force sensor and all of the signal input parts and the signal output parts is directly associated with the manufacture process of the through-holes. In the related art, after an overall consideration is made for hole-diameter of through-holes formed by manufacture, a distance between adjacent through-holes and a distance between the through-hole and a border, the width $L_1$ of the overlapping portions between the force sensor and all of the signal input parts and the signal output parts is selected as about 7-14 µm. Therefore, in an embodiment of the present disclosure, the length L of the short sides of all of the first signal input part 20, the second signal input part 40, the first signal output part 30 and the second signal output part 50 is 14-20 µm.

In one embodiment, the overlapping portions of the diagonal lines of the force sensor 10 with the first signal input part 20, the second signal input part 40, the first signal output part 30 and the second signal output part 50 have lengths d which are 18-53 µm. It should be noted that, the above length d of the overlapping portions may be deduced based on the size of the force sensor in the related art. For example, as shown in FIG. 7, when the force sensor in the related art have diagonal lines with the lengths W, as shown in FIG. 7(a), the lengths of the overlapping portions between the force sensor and all of the signal input parts and the signal output parts are about $W/\sqrt{2}$, and as shown in FIG. 7(b), the length of each of two portions of the force sensor 10 overlapped with each of the signal input parts and the signal output parts is about $W/2\sqrt{2}$. It can be known from FIGS. 7(b)-7(d), this length is the length d of the overlapping portions between the diagonal lines of the force sensor 10 and each of the first signal input part 20, the second signal input part 40, the first signal output part 30 and the second signal output part 50. In general, in the related art the length W of the diagonal lines of the force sensor is about 50-150 µm. Therefore, in an embodiment of the present disclosure, the overlapping portions between the diagonal lines of the force sensor 10 and each of the first signal input part 20, the second signal input part 40, the first signal output part 30 and the second signal output part 50 have a length d of 18-53 µm.

Exemplarily, when the diagonal lines of the force sensor in the related art have lengths of 150 µm, correspondingly, in an embodiment of the present disclosure, the overlapping portions between the diagonal lines of the force sensor 10 and the first signal input part 20, the second signal input part 40, the first signal output part 30 and the second signal output 50 all have a length d of 30 µm.

In addition, in an embodiment of the present disclosure, a side length b of a square-shaped opening 11 provided in the force sensor 10 is selected as 20 µm. It should be noted that, a size of the side length b of the square-shaped opening 11 can be deduced based on the size of the force sensor in the related art. For example, as shown in FIGS. 7(a) and 7(b), all the portions of the force sensor in the related art making larger contribution to the output signal, located between the connected signal input parts and signal output parts, have a minimum length b. As known from FIGS. 7(b)-7(d), the minimum length b is the side length b of the square-shaped opening 11.

In addition, in an embodiment of the present disclosure, in a plane parallel to the display substrate 1, the first signal input part 20, the second signal input part 40, the first signal output part 30 and the second signal output part 50, together with the square-shaped opening 11, can form several types of location relationships.

Figure 10:
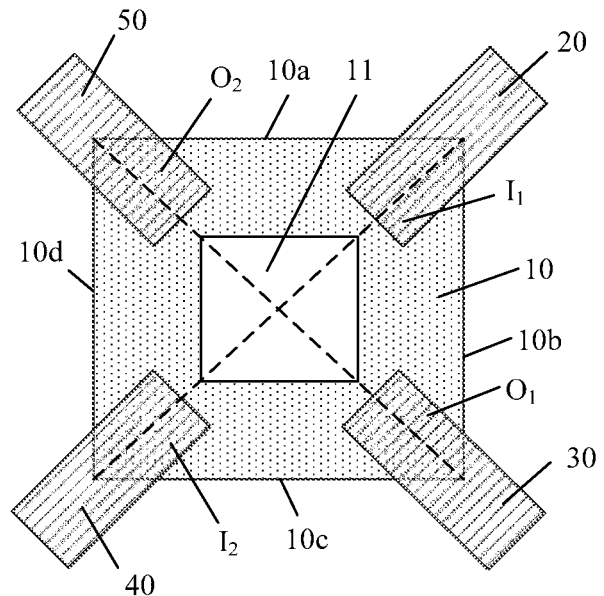
FIG. 10 is a fourth top view of a force sensor according to an embodiment of the present disclosure.

In a first example, as shown in FIG. 10, which is a fourth top view of the force sensor according to an embodiment of the present disclosure, in a plane parallel to the display substrate 1, none of the first signal input part 20, the second signal input part 40, the first signal output part 30 and the second signal output part 50 extends to outer borders of the square-shaped opening.

In a second example, as shown in FIG. 2, in the plane parallel to the display substrate 1, each of the first signal input part 20, the second signal input part 40, the first signal output part 30 and the second signal output part 50 extends to the outer border of the square-shaped opening 11. The first signal input part 20, which is rectangle-shaped, is taken as an example. In this case, the long side of the first signal input part 20 extends in a direction parallel to a direction of a diagonal line of the force sensor 10 corresponding to the corner at which it is located, and this first signal input part 20 has a midline parallel to the direction of the long side which is in line with the diagonal line. The expression of "the first signal input part 20 extends to the outer border of the square-shaped opening 11" means that only short sides of the first signal output part 20 are overlapped with the square-shaped opening 11, but the long sides are not overlapped with the square-shaped opening 11. The similar understanding may be made for the expressions of "the second signal input part 40 extends to the outer border of the square-shaped opening 11", "the first signal output part 30 extends to the outer border of the square-shaped opening 11" and "the second signal output part 50 extends to the outer border of the square-shaped opening 11", and thus it is unnecessary to repeat herein.

Correspondingly, all of borders of the square-shaped opening 11 are separated from corresponding sides of the force sensor 10 by a perpendicular distance of $d/\sqrt{2}$, and d is a length of an overlapping portion between a diagonal line of the force sensor and each of the first signal input part 20, the second signal input part 40, the first signal output part 30 and the second signal output part 50. In one embodiment, each side of the square-shaped opening 11 is separated from the corresponding side of the force sensor 10 by the perpendicular distance which is 20 µm.

Figure 11:
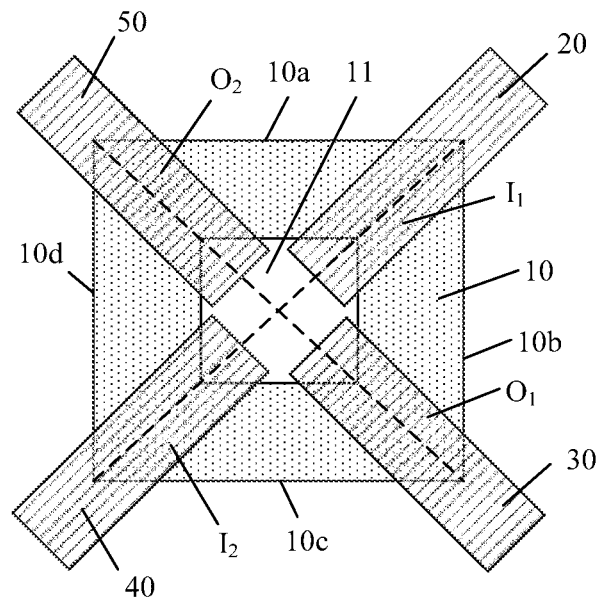
FIG. 11 is a fifth top view of a force sensor according to an embodiment of the present disclosure.

In a third example, as shown in FIG. 11, which is a fifth top view of the force sensor according to an embodiment of the present disclosure, in the plane parallel to the display substrate 1, each of the first signal input part 20, the second signal input part 40, the first signal output part 30 and the second signal output part 50 extends into an interior of the square-shaped opening 11, and any two of the first signal input part 20, the second signal input part 40, the first signal output part 30 and the second signal output part 50 are mutually insulated. The first signal input part 20, which is rectangle-shaped, is taken as an example. In this case, the long side of the first signal input part 20 extends in a direction parallel to a direction of a diagonal line of the force sensor 10 corresponding to the corner at which it is located, and this first signal input part 20 has a midline parallel to the direction of the long side which is in line with the diagonal line. The expression of "the first signal input part 20 extends into the interior of the square-shaped opening 11" means that both short sides and long sides of the first signal output part 20 are overlapped with the square-shaped opening 11. The similar understanding may be made for the expressions of "the second signal input part 40 extends into the interior of the square-shaped opening 11", "the first signal output part 30 extends into the interior of the square-shaped opening 11" and "the second signal output part 50 extends into the interior of the square-shaped opening 11", and thus it is unnecessary to repeat herein.

In a first example, there is a less overlapping area between the force sensor 10 and each of the first signal input part 20, the second signal input part 40, the first signal output part 30 and the second signal output part 50, so that there is a larger contact resistance between the force sensor 10 and each of the first signal input part 20, the second signal input 40, the first signal output part 30 and the second signal output part 50. In this case, the output signals and the input signals have a larger loss during signal transmission, leading to a lower precision and sensitivity for a force detected by the force sensor 10, which is to a disadvantage for the performance of the force sensor 10. In a second example and a third example, there is a maximum overlapping area between the force sensor 10 and each of the first signal input part 20, the second signal input part 40, the first signal output part 30 and the second signal output part 50, so that there is a less contact resistance between the force sensor 10 and each of the first signal input part 20, the second signal input part 40, the first signal output part 30 and the second signal output part 50. In this case, the output signals and the input signals have a less loss during signal transmission, leading to a higher precision and sensitivity for a force detected by the force sensor 10, which may provide improving the performance of the force sensor 10.

When the force sensor 10 according to the present disclosure has a structure as shown in FIG. 2, the side length W' of the force sensor 10 meets $W'=2d/\sqrt{2}+b$. Exemplarily, in order to achieve the same or similar performance of a diagonal line with a length of W=150 μm in the related art, the embodiments of the present disclosure select dimensions as d=30 μm and b=20 μm, and thus W' is about 60 μm, which is much less than 150 μm in the related art.

As for the second type, as shown in FIG. 3, the force sensor 10 is a one-piece structure, and such a design can be beneficial for reducing zero-shift and temperature compensation of the force sensor 10. This is because: on one hand, when the force sensor 10 is a one-piece structure, the current between the signal input ends and respective signal output ends may not only flow through surrounding regions of the force sensor 10, but also at the same time flow through middle regions of the force sensor 10, so as to alleviate the influence of the force sensor on the output signals due to manufacture process, which influence results from initial resistances between signal input ends and respective signal output ends of the force sensor 10 deviating from a preset value, so that it may provide reducing zero-shift of the force sensor 10; on the other hand, when the force sensor 10 is a one-piece structure, the entire force sensor 10 has a uniform temperature distribution, and thus the resistances between the signal input ends and respective signal output ends subject to substantially identical influence from the temperature, so as to be beneficial for reducing temperature compensation of the force sensor 10. In one embodiment, the force sensor 10 with the second structure is the same as the force sensor 10 with the first structure, except that a square-shaped opening is not provided at the geometrical center.

As shown in FIG. 3, according to an embodiment of the present disclosure, the first signal input part 20, the second signal input 40, the first signal output part 30 and the second signal output part 50 are rectangle-shaped. In such a rectangle, long sides extend in a direction parallel to a direction of a diagonal line of the force sensor 10 corresponding to a corner formed at which it is located, and a midline parallel to the direction of the long sides is in line with the diagonal line, so that there is a larger overlapping area between the force sensor 10 and each of the first signal input part 20, the second signal input 40, the first signal output part 30 and the second signal output part 50, which may provide reducing a contact resistance between the force sensor 10 and each of the first signal input part 20, the second signal input 40, the first signal output part 30 and the second signal output part 50. The less the contact resistance, the less the loss of the output signals and the input signals during signal transmission, and the higher the precision and sensitivity of a force detected by the force sensor 10.

Furthermore, the first signal input part 20, the second signal input 40, the first signal output part 30 and the second signal output part 50 have short sides with the same length L, and there are overlapping portions with the same length d between a diagonal line of the force sensor 10 as well as the first signal input part 20, the second signal input 40, the first signal output part 30 and the second signal output part 50, respectively, so that contact resistances between the force sensor 10 and the first signal input part 20, the second signal input 40, the first signal output part 30 and the second signal output part 50 respectively are the same, resulting in that the input signals and the output signals have the same or similar loss during signal transmission. Therefore, a difference between the output signal of the first signal output part 30 and the output signal of the second signal part 50 can accurately indicate the change of the resistance of the force sensor 10, which may provide improving the precision of a force detected by the force sensor 10.

In one embodiment, the length L of short sides of each of the first signal input part 20, the second signal input 40, the first signal output part 30 and the second signal output part 50 is 14-20 μm. It should be noted that, the above value of the short side length L may be deduced based on a size of the force sensor in the related art. For example, as shown in FIG. 6, when the diagonal line of the force sensor in the related art has a length W, as shown in FIG. 6(a), the overlapping portion between the force sensor and each of the signal input parts and the signal output parts has a width $L_1$, and as known in FIGS. 6(b)-6(d), the first signal input part 20, the second signal input part 40, the first signal output part 30 and the second signal output part 50 according to the present disclosure have short sides with a length L equal to $2L_1$. As in general the signal input parts and the signal output parts are all electrically connected with the force sensor via through-holes, the width $L_1$ of the overlapping portion between the force sensor and each of the signal input parts and the signal output parts is directly associated with the manufacture process of the through-holes. In the related art, after an overall consideration is made for a hole diameter of the through-hole formed by manufacture, a distance between adjacent through-holes and a distance between the through-hole and a border, the width $L_1$ of the overlapping portion between the force sensor and each of the signal input parts and the signal output parts is selected as about 7-14 μm. Therefore, the first signal input part 20, the second signal input part 40, the first signal output part 30 and the second signal output part 50 according to an embodiment of the present disclosure have short sides with a length L which are 14-20 μm.

In one embodiment, the overlapping portion between the diagonal line of the force sensor 10 and each of the first signal input part 20, the second signal input 40, the first signal output part 30 and the second signal output part 50 has a length d which is 18-53 μm. It should be noted that, the value of the above length d of the overlapping portion may be deduced based on a size of the force sensor in the related art. For example, as shown in FIG. 6, when the diagonal line of the force sensor in the related art has a length W, as shown in FIG. 6(a), the length of the overlapping portion between the force sensor and each of the signal input parts and the signal output parts is about W/√2; as shown in FIG. 6(b), the length of each of two portions of the force sensor overlapped with each of the signal input parts and the signal output parts may be less than W/2√2; and as known in FIGS. 6(b)-6(d), this length is the length d of the overlapping portion between the diagonal line of the force sensor 10 and each of the first signal input part 20, the second signal input part 40, the first signal output part 30 and the second signal output part 50 according to the present disclosure. In general, the length W of the diagonal line of the force sensor in the related art is about 50-150 μm, therefore, in an embodiment of the present disclosure, the length d of the overlapping portion between the diagonal line of the force sensor 10 and each of the first signal input part 20, the second signal input part 40, the first signal output part 30 and the second signal output part 50 is 18-53 μm. Exemplarily, the length d of the overlapping portion between the diagonal line of the force sensor 10 and each of the first signal input part 20, the second signal input part 40, the first signal output part 30 and the second signal output part 50 is about 30 μm.

When the force sensor 10 according to the present disclosure has the structure as shown in FIG. 3, the side length W' of the force sensor 10 is equal to the side length W' of the force sensor 10 when the force sensor 10 has the structure as shown in FIG. 2, and thus it is unnecessary to repeat herein.

Exemplarily, when the force sensor 10 according to an embodiment of the present disclosure is approximately square-shaped, the force sensor 10 has the structure as shown in FIG. 6, the shape of which is a corner-missing square in which corners at each of locations corresponding to the first signal input end 20, the second signal input end 40, the first signal output end 30 and the second signal output end 50 are not presented. A size of the corner-missing portion corresponding to each of the signal input ends and the signal output ends is associated with whether it is located at the long side or at the short side of a rectangle in the related art. In one embodiment, as shown in FIG. 9, when in the related art each signal input end is located at the long sides (the length is $W_1$) and each signal output end is located at short sides (the length is $W_2$), the corner-missing portion corresponding to the first signal input end 20 and the second signal output end 40 is relatively smaller, but the corner-missing portion corresponding to the first signal output end 30 and the second signal output end 50 is relatively larger.

As known in FIG. 9, according to an embodiment of the present disclosure, the size of the approximately square-shaped force sensor 10 can be deduced based on the size of a rectangle-shaped force sensor in the related art. For example, as shown in FIG. 9(b), a square-shaped portion in which the force sensor has been eliminated in the related art has a side length b. Since the force sensor 10 according to the present disclosure is formed by inwardly folding portions located between adjacent signal input parts and signal output parts in FIG. 9(b), the four sides (in which four missed corners are omitted) of the force sensor 10 according to an embodiment of the present disclosure also each have a length b. The overlapping portion between the diagonal line of the force sensor 10 and each of the first signal input end 20 and the second signal input end 40 has a length of about $W_1/2$, and the overlapping portion between the diagonal line of the force sensor 10 and each of the first signal output end 30 and the second signal output end 50 has a length of about $W_2/2$. The short side length d of each of the signal input ends and the signal output ends is twice of the width of the contact portion between the force sensor and each of the signal input ends and the signal output ends in the related art. As shown in FIG. 9(b), the width X of the force sensor in the related art is about $(W_1^2+W_2^2)^{1/2}$, which is about 2a+b, and four corners missed in the square-shaped portion substantially correspond to midpoints of all the sides of the force sensor in the related art. Therefore, after portions located between adjacent signal input parts and signal output parts in FIG. 9(b) are inwardly folded to form the structure as shown in FIG. 9(c), the force sensor 10 in an embodiment of the present disclosure as shown in FIG. 9(c) has a width X' (i.e. the size in a y-direction in FIG. 9), which is about $(W_1^2+W_2^2)^{1/2}/2$, approximately equal to b. As known from above, the size of the force sensor 10 according to the present disclosure is less than the size of the force sensor in the related art.

In addition, in an embodiment of the present disclosure, the first signal input part 20, the second signal output part 40, the first signal output part 30 and the second signal output part 50 are all selectively located at the same film layer, so that the first signal input part 20, the second signal output part 40, the first signal output part 30 and the second signal output part 50 can be formed at the same time, so as to simplify the manufacture process of the display substrate 1 according to the present disclosure and reduce manufacture cost.

Figure 12:
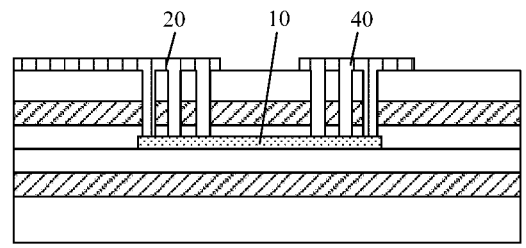
FIG. 12 is a cross-sectional view along an A-A' direction in FIG. 1 according to an embodiment of the present disclosure.

In an embodiment of the present disclosure, selectively, as shown in FIG. 12, which is a cross-sectional view along a direction A-A' in FIG. 1 according to an embodiment of the present disclosure, the first signal input part 20, the second signal input part 40, the first signal output part 30 and the second signal output part 50 are located at a film layer which is different from a film layer at which the force sensor is located. The first signal input part 20, the second signal input part 40, the first signal output part 30 and the second signal output part 50 are electrically connected with the force sensor 10 via a plurality of through-holes. FIG. 12 just schematically shows the first signal input part 20 and the second signal input part 40. In addition, FIG. 12 just schematically shows that each of the first signal input part 20 and the second signal input part 40 is electrically connected with the force sensor 10 via three through-holes. It is appreciated that, the number of the through-holes is not limited herein. The above configuration is made so that the first signal input part 20, the second signal input part 40, the first signal output part 30 and the second signal output part 50, together with a certain metal film layer in the display area AA, can be formed at the same time. In this case, under the premise that the manufacture difficulty and cost of the display substrate are not increased, the first signal input part 20, the second signal input part 40, the first signal output part 30 and the second signal output part 50 have good electrical conductivity, which may provide improving the performance of the force sensor 10.

Figure 13:
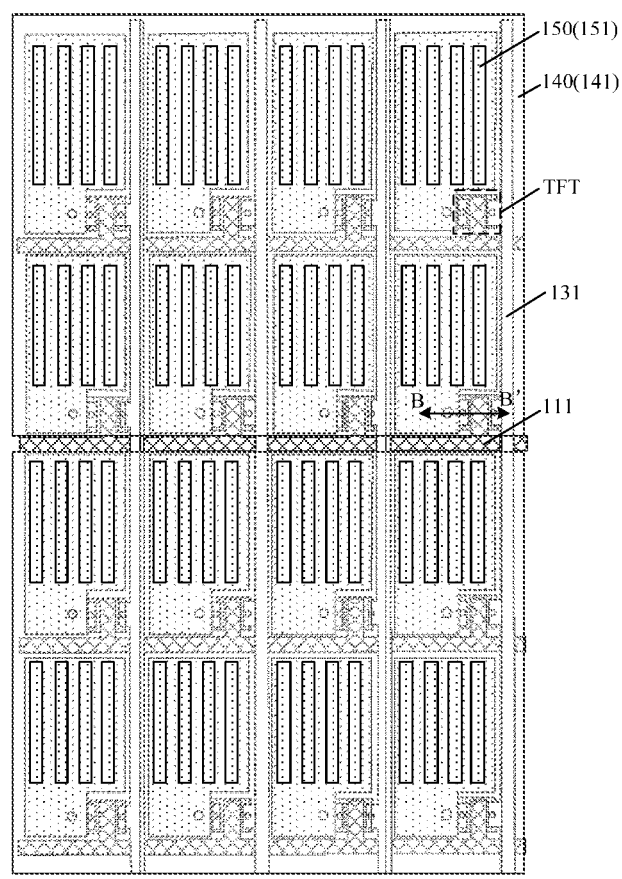
FIG. 13 is a top view of a display region of a display substrate according to an embodiment of the present disclosure.
Figure 14:
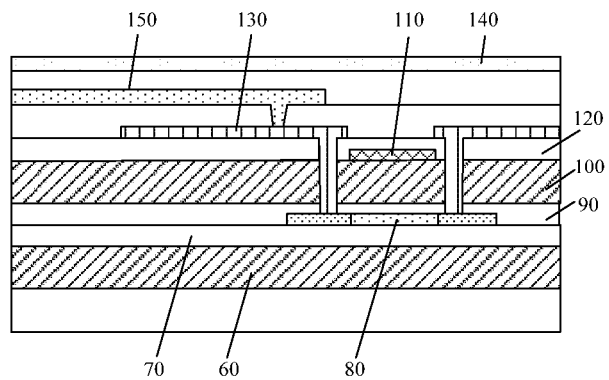
FIG. 14 is a cross-sectional view along a B-B' direction in FIG. 13 according to an embodiment of the present disclosure.

Exemplarily, as shown in FIG. 13 and FIG. 14, FIG. 13 is a top view of a display area of a display substrate according to an embodiment of the present disclosure, and FIG. 14 is a cross-sectional view along a B-B' direction in FIG. 13 according to an embodiment of the present disclosure. In an embodiment of the present disclosure, in the display area AA, in a direction perpendicular to the display substrate 1, a first silicon-nitride layer 60, a first silicon-oxide layer 70, a polysilicon layer 80, a second silicon-oxide layer 90 and a second silicon-nitride layer 100 are disposed adjacent to each other sequentially. In this case, in order to simplify the manufacture process of the display substrate 1 and reduce the cost, the present disclosure selects the material of the force sensor 10 as polysilicon, and the force sensor 10 and the polysilicon layer 80 are located at the same film layer.

Furthermore, as shown in FIG. 14, the display area AA of the display substrate 1 according to an embodiment of the present disclosure is provided with a gate metal layer 110, a first insulation layer 120 and a source-drain metal layer 130. The gate metal layer 110, the first insulation layer 120 and the source-drain metal layer 130 are sequentially provided on the second silicon-nitride layer 100 along a direction away from the display substrate 1.

The gate metal layer 110 is provided with a gate line 111 and a gate of a thin-film transistor TFT. The source-drain metal layer 130 is provided with a data line 131, and a source and a drain of the thin-film transistor TFT. The polysilicon layer 80 is provided with an active layer 80 of the thin-film transistor TFT. The source and the drain of the thin-film transistor TFT respectively extend through through-holes of the second silicon-oxide layer 90, the second silicon-nitride 100 and the first insulation layer 120, and are connected with the active layer 80. A gate of the thin-film transistor TFT is electrically connected with the gate line 111. In order to obtain a smaller contact resistance between the source and the drain of the thin-film transistor TFT and the active layer, a region of the active layer except a channel region may be high-concentration doped, so as to form two Ohm contact regions, which are connected with the source and the drain of the thin-film transistor respectively.

On this basis, in an embodiment of the present disclosure, the first signal input part 20, the second signal input part 40, the first signal output part 30 and the second signal output part 50, together with the gate metal layer 110 or the source-drain metal layer 130, may be manufactured at the same film layer.

In addition, when the display substrate 1 is an array substrate in a liquid crystal display panel, as shown in FIG. 13, the display area AA of the display substrate 1 according to an embodiment of the present disclosure may be provided with a common electrode layer 140 and a pixel electrode layer 150 insulated from each other. The common electrode layer 140 is provided with a plurality of common electrode blocks 141, which may be multiplexed as a touch-controlled electrode in a touch-controlled stage and used to detect a touch-control position. The pixel electrode layer 150 is provided with a plurality of pixel electrodes 151, each of which is electrically connected with the drain of the above thin-film transistor TFT. The source of the thin-film transistor TFT is electrically connected with the data line 131.

During displaying, a multi-dimensional electric field is formed between the pixel electrodes 151 and the common electrode blocks 141 to control deflection of liquid crystal molecules. In one embodiment, FIG. 13 only takes such a configuration as an example that the pixel electrode layer 150 is located under the common electrode layer 140 and the common electrode 141 is provided with a slit. It is appreciated that, the pixel electrode layer 150 may also be disposed above the common electrode layer 140. In this case, it is just necessary that the pixel electrode 151 is provided with a slit, which would not be limited by embodiments of the present disclosure.

As known from above, the force sensor 10 according to the embodiment of the present disclosure is made of polysilicon. The force sensor 10 according to the present disclosure does not take use of the semiconductor property of polysilicon, but its electrical conductivity. Therefore, a material of the force sensor 10 according to the present disclosure may be a heavily-doped polysilicon, and either N-type dopant or P-type dopant is available. In one embodiment, in the dopant, a surface-dopant concentration is $10^{10}/cm^2 \sim 10^{15}/cm^2$. The polysilicon with the above surface-dopant concentration can ensure that a value of a strain resistance of the force sensor 10 would not be too large, which may provide the transmission and detection of a signal, and also effectively protect a crystal lattice structure of polysilicon from being damaged.

In addition, when the force sensor 10 detects magnitudes of forces at respective positions at which the display panel is pressed, the larger deformation differences corresponding to a first strain direction and a second strain direction of the force sensor 10, the higher the sensitivity of the force sensor 10. When the force sensor 10 is rectangle-shaped, the first strain direction is an extending direction of the first side 10a and the third side 10c, and the second strain direction is an extending direction of the second side 10b and the fourth side 10d.

In one embodiment, as shown in FIG. 1, the display substrate 1 is rectangle shaped. When force sensors 10 are provided on two sides opposite to each other, in an embodiment of the present disclosure, selectively, the extending direction of the first side 10a and the third side 10c of each force sensor 10 is perpendicular to an extending direction x of two sides provided with the force sensors 10. Such a configuration may result in that the first strain direction and the second strain direction of the force sensor 10 correspond to a large deformation difference. Values of output signals of the force sensor 10 when subjecting to force from different positions are all positive values, and no negative value or zero value would occur, which may provide enhancing the sensitivity of the force sensor 10 and simplifies a calculation process when the force sensor 10 detects the magnitude of force.

Regarding display substrates with other shapes, a simulation manner may be used to apply force at different positions of the display panel of the display substrate, which is determined by the output signal of the force sensor 10, so that the deformation corresponding to the first strain direction and the second strain direction of the force sensor 10 is larger. The inventor of the present disclosure found that, this property is associated with fixing manners (e.g. partial fixing, peripheral fixing, etc.) of the display panel of the display substrate and shapes (e.g. rectangle, circular, etc.) of the display substrate.

Figure 15:
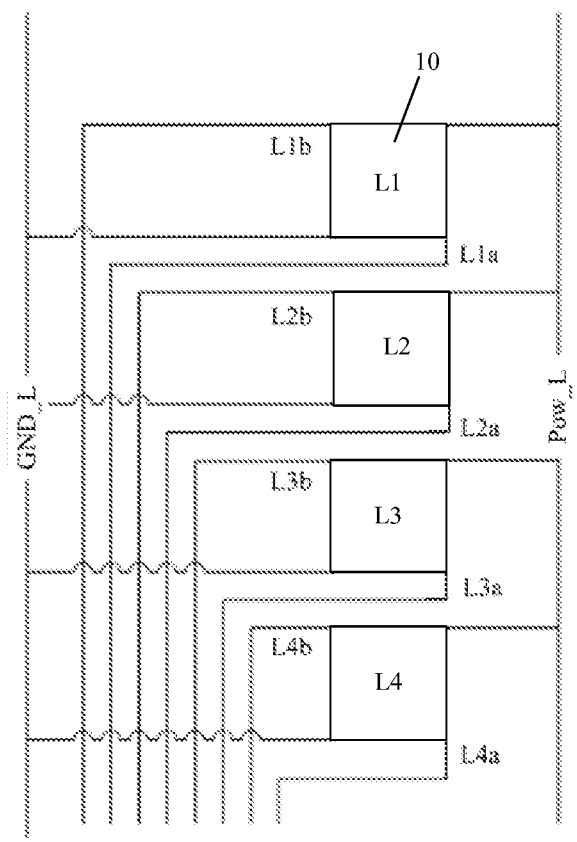
FIG. 15 is a connection diagram of force sensors according to an embodiment of the present disclosure.

In addition, as shown in FIG. 1, four force sensors 10 are provided uniformly on each of two sides opposite to each other of the peripheral region NA of the display panel 1. As shown in FIG. 15, FIG. 15 is a connection diagram of the force sensor according to an embodiment of the present disclosure. Four force sensors 10 shown in FIG. 15 are respectively indicated as L1, L2, L3 and L4. The first signal input ends of the four force sensors 10 are electrically connected with an integrated circuit (not shown in FIG. 15) via the same one wiring (which is indicated as GND_L in FIG. 15). The second signal input ends of the four force sensors 10 are electrically connected with the integrated circuit via the same one wiring (which is indicated as Pow_L in FIG. 15). The signal output ends (i.e. L1a, L1b, L2a, L2b, L3a, L3b, L4a and L4b shown in FIG. 15) of the four force sensors 10 are all electrically connected with the integrated circuit via respective wirings thereof. In one embodiment, in an embodiment of the present disclosure, the number of the force sensors 10 provided uniformly on each of two sides opposite to each other of the peripheral region NA of the display panel 1 is not limited to 4, but can also be other number, e.g. 3, 5, etc.

An embodiment of the present disclosure also provides a display panel including the display substrate as above. In one embodiment, the display panel in the present disclosure may be a liquid-crystal display panel, an organic light emitting display panel or a micro light-emitting diode display panel. Embodiments of the present disclosure do not limit with respect of the type of display panel.

As an example, the display panel is a liquid-crystal display panel, which includes an array substrate and a color-film substrate opposite to each other. A liquid-crystal layer is provided between the array substrate and the color-film substrate. The array substrate is provided with a plurality of gate lines and a plurality of data lines arranged in a crisscross manner. The plurality of gate lines and the plurality of data lines define a plurality of pixel units, each of which is provided with a thin-film transistor and a pixel electrode. The gate of the thin-film transistor is electrically connected with the gate line, the source is electrically connected with the data line, and the drain is electrically connected with the pixel electrode. The color-film substrate includes a grid-shaped black matrix and a plurality of color filters arranged in an array and provided within the black matrix. The color filters include red color filters, green color filters and blue color filters. The array substrate or the color-film substrate is also provided with a common electrode, which controls deflection of liquid crystal molecules by an electric field between the pixel electrode and the common electrode.

As an example, the display panel is an organic light-emitting display panel, including an array substrate with a plurality of pixel circuits. The organic light-emitting diode display panel also includes a plurality of organic light-emitting diodes (OLEDs) provided on the array substrate, each of which has an anode is correspondingly electrically connected with the pixel circuit on the array substrate, The plurality of organic light-emitting diodes include light-emitting diodes for emitting red light, light-emitting diodes for emitting green light and light-emitting diodes for emitting blue light. In addition, the organic light-emitting display panel also includes a packaging layer packaging the plurality of organic light-emitting diodes.

As an example, the display panel is a micro light-emitting diode display panel, including an array substrate with a plurality of pixel circuits. The micro light-emitting diode display panel also includes a plurality of micro light-emitting diodes (Mic-LEDs) provided on the array substrate, each of which has an anode correspondingly electrically connected with the pixel circuits on the array substrate. The plurality of micro light-emitting diodes include micro light-emitting diodes for emitting red light, micro light-emitting diodes for emitting green light and micro light-emitting diodes for emitting blue light. The micro light-emitting diode may be manufactured on a growth substrate, and then transferred onto the array substrate.

Figure 16:
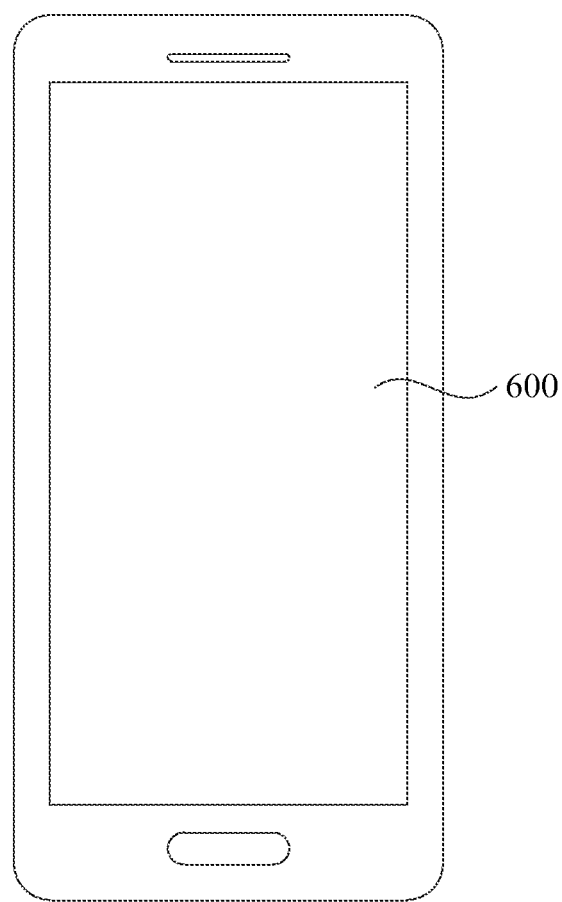
FIG. 16 is a top view of a display device according to an embodiment of the present disclosure.

An embodiment of the present disclosure also provides a display device, as shown in FIG. 16. FIG. 16 is a top view of a display device according to an embodiment of the present disclosure. The display device includes the above-mentioned display panel 600. When the display panel is a liquid crystal display panel, the display device also includes a backlight device, which is located on one side of the array substrate of the liquid crystal display panel away from the color-film substrate. The backlight device provides light beams to the display panel. The display device according to the present disclosure may be any product or component with a display function, e.g. smartphone, wearable smart watch, smart glasses, tablet computer, television, display screen, laptop, digital photo frame, navigator, vehicle monitor, E-book, etc.

Embodiments of the present disclosure provide a display substrate, a display panel and a display device. The display substrate includes a display region and a peripheral region surrounding the display region. A plurality of force sensors, i.e. silicon-based force sensors, is provided in the peripheral region. The force sensor is rectangle shaped, and has a first side, a second side, a third side and a fourth side interconnected end-to-end sequentially. The inventor of the present disclosure found that, because two signal input parts of the force sensor in the related art are provided on two sides opposite to each other of the force sensor respectively, and two signal output parts are provided on the other two sides of the force sensor, the portion of the force sensor making the most contribution to the output signal is a portion located between adjacent signal input ends and signal output ends, i.e. regions corresponding to four corners, so that most regions in the force sensor make less contribution to the output signal. In comparison, in the force sensor according to the embodiments of the present disclosure, a first signal input part is connected at the corner between the first side and the second side, a first signal output part is connected at the corner between the second side and the third side, a second signal input part is connected at the corner between the third side and the fourth side, and a second signal output part is connected at the corner between the fourth side and the first side, so that the portion of the force sensor according to the embodiments of the present disclosure making the most contribution to the output signal is the regions corresponding to the four sides. As for the same force sensor, the area of the regions corresponding to the four sides may be larger than the area of the regions corresponding to the four corners. Therefore, when the force sensor according to the embodiments of the present disclosure has a performance similar to that of the force sensor in the related art (i.e. the area of the region corresponding to the four sides in the embodiments of the present disclosure is close to the area of the region corresponding to the four corners in the related art), the size of the force sensor according to the embodiments of the present disclosure is less than the size of the force sensor in the related art, so as to reduce the frame width of the display panel, which may provide narrowing the frame of the display panel.

What is claimed is:

1. A display substrate, comprising:
   a display region and a peripheral region surrounding the display region, wherein a plurality of force sensors, which are silicon-based force sensors, is provided in the peripheral region, and each of the plurality of force sensors is square-shaped and has a first side, a second side, a third side and a fourth side interconnected end-to-end;

wherein a first signal input part is electrically connected at a first corner formed between the first side and the second side and the first corner comprises a first vertex formed by the first side and the second side, a first signal output part is electrically connected at a second corner formed between the second side and the third side and the second corner comprises a second vertex formed by the second side and the third side, a second signal input part is electrically connected at a third corner formed between the third side and the fourth side and the third corner comprises a third vertex formed by the third side and the fourth side, and a second signal output part is electrically connected at a fourth corner formed between the fourth side and the first side and the fourth corner comprises a fourth vertex formed by the fourth side and the first side;

wherein each of the first signal input part, the second signal input part, the first signal output part and the second signal output part is of a rectangle shape consisting of two long sides and two short sides, wherein the long sides extend in a direction parallel to a direction of a diagonal line of the force sensor corresponding to the corner at which the rectangle shape is located, and a midline of the two long sides is parallel to a direction of the long sides and is in line with the diagonal line;

wherein each of the plurality of force sensors is provided with a square-shaped opening, and a geometrical center of the square-shaped opening coincides with a geometrical center of the force sensor; and wherein the first signal input part overlaps with the first corner, the first vertex, the first side and the second side; the first signal output part overlaps with the second corner, the second vertex, the second side and the third side; the second signal input part overlaps with the third corner, the third vertex, the third side and the fourth side; and the second signal output part overlaps with the fourth corner, the fourth vertex, the fourth side and the first side; and each of the first signal input part, the second signal input part, the first signal output part and the second signal output part comprises two opposite ends arranged along the diagonal line, and one of the two opposite ends that is arranged far away from the square-shaped opening extends out of the force sensor.

2. The display substrate in accordance with claim 1, wherein each of the plurality of force sensors is a one-piece structure.

3. The display substrate in accordance with claim 1, wherein short sides of the first signal input part, the second signal input part, the first signal output part and the second signal output part have a same length L, and overlapping portions of the first signal input part, the second signal input part, the first signal output part and the second signal output part with the diagonal lines of the force sensor have a same length d.

4. The display substrate in accordance with claim 3, wherein the length L is 14-20 µm, and the length d is 18-53 µm.

5. The display substrate in accordance with claim 4, wherein the length d is 30 µm.

6. The display substrate in accordance with claim 1, wherein a side length b of the square-shaped opening is 20 µm.

7. The display substrate in accordance with claim 1, wherein in a plane parallel to the display substrate, the first signal input part, the second signal input part, the first signal output part and the second signal output part extends to an outer border of the square-shaped opening.

8. The display substrate in accordance with claim 1, wherein in a plane parallel to the display substrate, the first signal input part, the second signal input part, the first signal output part and the second signal output part extend to an interior of the square-shaped opening, and any two of the first signal input part, the second signal input part, the first signal output part and the second signal output part are insulated from each other.

9. The display substrate in accordance with claim 8, wherein a side of the square-shaped opening is spaced from a side of the force sensor corresponding to the side of the square-shaped opening by a perpendicular distance which is equal to $d/\sqrt{2}$, wherein d is a length of an overlapping portion of a diagonal line of the force sensor with each of the first signal input part, the second signal input part, the first signal output part and the second signal output part.

10. The display substrate in accordance with claim 9, wherein the perpendicular distance is 20 µm.

11. The display substrate in accordance with claim 1, wherein a length of each side of the force sensor is 20-60 µm.

12. The display substrate in accordance with claim 1, wherein the first signal input part, the second signal input part, the first signal output part and the second signal output part are located at a same film layer.

13. The display substrate in accordance with claim 12, wherein the film layer at which the first signal input part, the second signal input part, the first signal output part and the second signal output part are located is different from a film layer at which the plurality of force sensors are located, and the first signal input part, the second signal input part, the first signal output part and the second signal output part are electrically connected with the plurality of force sensors via a plurality of through-holes, respectively.

14. A display panel, comprising:

a display substrate comprises a display region and a peripheral region surrounding the display region, wherein a plurality of force sensors, which are silicon-based force sensors, is provided in the peripheral region, and each of the plurality of force sensors is square-shaped and has a first side, a second side, a third side and a fourth side interconnected end-to-end;

wherein a first signal input part is electrically connected at a first corner formed between the first side and the second side and the first corner comprises a first vertex form by the first side and the second side, a first signal output part is electrically connected at a second corner formed between the second side and the third side and the second corner comprises a second vertex form by the second side and the third side, a second signal input part is electrically connected at a third corner formed between the third side and the fourth side and the third corner comprises a third vertex form by the third side and the fourth side, and a second signal output part is electrically connected at a fourth corner formed between the fourth side and the first side and the fourth corner comprises a fourth vertex form by the fourth side and the first side;

wherein each of the first signal input part, the second signal input part, the first signal output part and the second signal output part is of a rectangle shape consisting of two long sides and two short sides, wherein the long sides extend in a direction parallel to a direction of a diagonal line of the force sensor corresponding to the corner at which the rectangle shape is located, and a midline of the two long sides is parallel to a direction of the long sides and is in line with the diagonal line;

wherein each of the plurality of force sensors is provided with a square-shaped opening, and a geometrical center of the square-shaped opening coincides with a geometrical center of the force sensor; and wherein the first signal input part overlaps with the first corner, the first vertex, the first side and the second side; the first signal output part overlaps with the second corner, the second vertex, the second side and the third side; the second signal input part overlaps with the third corner, the third vertex, the third side and the fourth side; and the second signal output part overlaps with the fourth corner, the fourth vertex, the fourth side and the first side; and each of the first signal input part, the second signal input part, the first signal output part and the second signal output part comprises two opposite ends arranged along the diagonal line, and one of the two opposite ends that is arranged far away from the square-shaped opening extends out of the force sensor.

15. A display device, comprising:

a display panel comprising a display substrate, wherein the display substrate comprises a display region and a peripheral region surrounding the display region, wherein a plurality of force sensors, which are silicon-based force sensors, is provided in the peripheral region, and each of the plurality of force sensors is square-shaped and has a first side, a second side, a third side and a fourth side interconnected end-to-end;

wherein a first signal input part is electrically connected at a first corner formed between the first side and the second side and the first corner comprises a first vertex form by the first side and the second side, a first signal output part is electrically connected at a second corner formed between the second side and the third side and the second corner comprises a second vertex form by the second side and the third side, a second signal input part is electrically connected at a third corner formed between the third side and the fourth side and the third corner comprises a third vertex form by the third side and the fourth side, and a second signal output part is electrically connected at a fourth corner formed between the fourth side and the first side and the fourth corner comprises a fourth vertex form by the fourth side and the first side;

wherein each of the first signal input part, the second signal input part, the first signal output part and the second signal output part is of a rectangle shape consisting of two long sides and two short sides, wherein the long sides extend in a direction parallel to a direction of a diagonal line of the force sensor corresponding to the corner at which the rectangle shape is located, and a midline of the two long sides is parallel to a direction of the long sides and is in line with the diagonal line;

wherein each of the plurality of force sensors is provided with a square-shaped opening, and a geometrical center of the square-shaped opening coincides with a geometrical center of the force sensor; and wherein the first signal input part overlaps with the first corner, the first vertex, the first side and the second side; the first signal output part overlaps with the second corner, the second vertex, the second side and the third side; the second signal input part overlaps with the third corner, the third vertex, the third side and the fourth side; and the second signal output part overlaps with the fourth corner, the fourth vertex, the fourth side and the first side; and each of the first signal input part, the second signal input part, the first signal output part and the second signal output part comprises two opposite ends arranged along the diagonal line, and one of the two opposite ends that is arranged far away from the square-shaped opening extends out of the force sensor.

* * * * *